United States Patent [19]

Johansson

[11] Patent Number: 5,521,612
[45] Date of Patent: May 28, 1996

[54] METHOD AND DEVICE FOR REDUCTION OF ELECTRIC FIELD RADIATION FROM A LIQUID CRYSTAL DISPLAY UNIT

[75] Inventor: Mats H. Johansson, Fredriksberg, Denmark

[73] Assignee: Multio Products Scandinavia AB, Sweden

[21] Appl. No.: 969,317

[22] PCT Filed: Aug. 20, 1991

[86] PCT No.: PCT/SE91/00550

§ 371 Date: Feb. 22, 1993

§ 102(e) Date: Feb. 22, 1993

[87] PCT Pub. No.: WO92/03827

PCT Pub. Date: Mar. 5, 1992

[30] Foreign Application Priority Data

Aug. 20, 1990 [SE] Sweden ................................. 9002697

[51] Int. Cl.[6] .................................................. G09G 3/36
[52] U.S. Cl. ............................ 345/102; 348/819; 348/820
[58] Field of Search ............................. 345/38, 50, 87, 345/102; 358/255; 348/818, 819, 820

[56] References Cited

U.S. PATENT DOCUMENTS

| | | | |
|---|---|---|---|
| 4,246,613 | 1/1981 | Choder et al. | 358/255 |
| 4,663,670 | 5/1987 | Ito et al. | 348/820 |
| 4,748,546 | 5/1988 | Ukrainsky | 345/102 |
| 4,853,791 | 8/1989 | Ginther, Jr. | 358/255 |
| 5,139,850 | 8/1992 | Clarke et al. | 358/255 |

FOREIGN PATENT DOCUMENTS

| | | |
|---|---|---|
| 62243350 | 3/1989 | Japan . |
| 457583 | 1/1989 | Sweden . |
| 8605062 | 8/1986 | WIPO . |

*Primary Examiner*—Richard Hjerpe
*Assistant Examiner*—Matthew Luu
*Attorney, Agent, or Firm*—Nies, Kurz, Bergert & Tamburro

[57] ABSTRACT

A display unit of the LCD type having a display side and a rear side. The display side is provided with a first layer that is both transparent and electrically conductive, and the rear side is provided with a layer that is electrically conductive. Both of the electrically conductive layers are electrically connected with each other and are also electrically connected to ground. The conduction of the electrically conductive layers is such as to make lower than 5 kΩ the resistance from any point on the display side or any point on the rear side to a point at which the conductive layers are connected.

10 Claims, 2 Drawing Sheets

METHOD AND DEVICE FOR REDUCTION OF ELECTRIC FIELD RADIATION FROM A LIQUID CRYSTAL DISPLAY UNIT

BACKGROUND OF THE INVENTION

1. Field of the Invention

The invention relates to a method and a device in a display unit of the LCD type for reducing time varying electric fields generated by the display unit.

2. Description of the Related Art

Display units have become more common in working localities and have recently been studied carefully with regard to different types of fields emitted therefrom. Different tests have shown that the emission has different effects on human tissue, but up to now the test results have been very contradictory.

One of the reasons for the results being contradictory and difficult to explain is probably that the picture of said field surrounding a display unit is very complex and comprises at least five different types of fields. Furthermore, in modern office premises there exists a high background level of emission from other electrical devices and installations.

A first type of field is the electrostatic field generating an electrostatic field between the surface of said display unit and any adjacent object having another potential, for instance a face.

Time varying electric fields or low frequency also surround a display unit. In frequently used cathode ray tubes said fields are comparatively weak, and therefore said fields have been considered harmless.

In a cathode ray tube which is included in the most common types of display units, a low frequency magnetic field is generated in the magnetic coils controlling the electron beam. It is very uncertain how the human being is affected by said field.

When the electron beam in a cathode ray tube hits the display surface an emission of radiation X-ray (s c soft emission) is generated. However, the major part thereof is stopped by the glass of the display unit.

Together with the visible light emitted from a display unit, a minor part of ultra-violet light is also emitted. Said ultra-violet light has more energy than the visible light.

Finally there is transmitted from the oscillator of the computer also radio frequency emissions, which all lower by at least a factor of 1000 than the present limit values.

In display units including cathode ray tubes it is previously known to cover the casing of the display unit with a conducting layer, and the front of the display unit with a transparent layer, the conducting ability thereof being such that higher electrical fields existing in these types of display units are attenuated almost completely around said unit. However, the weaker electrical fields, i.e., the fields having a strength of approximately 100 V/m, will remain to some extent.

SUMMARY OF THE INVENTION

In the type of display unit in accordance with the present invention, i.e., LCD (Liquid Crystal Display) or similar display units having corresponding electrical and magnetic properties, the problem of transmitting emission was not previously considered because there exist only time varying electrical fields, and possibly also radio frequency emissions from an associated computer.

An object of the present invention is to provide a method in a display unit of the LCD type according to which weaker electric fields are attenuated to a level below the background level. Also, a device for carrying out said method is provided.

Said object has been achieved by the invention having the characteristics hereinafter described.

BRIEF DESCRIPTION OF THE DRAWINGS

The invention will now be described in more detail by means of embodiments, reference being made to the accompanying drawings, in which.

DESCRIPTION OF THE PREFERRED EMBODIMENTS

Figure 1:
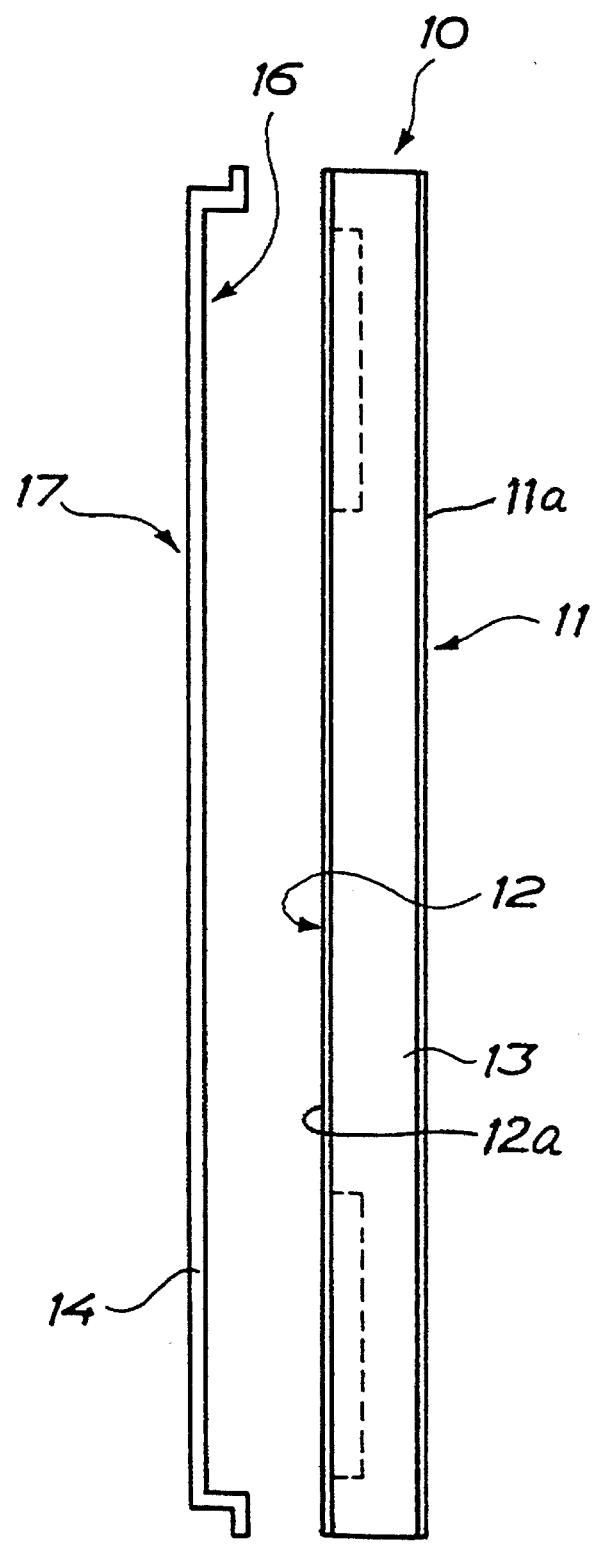
FIG. 1 is a side elevational view of a display unit for carrying out the method according to the invention.

With reference to FIG. 1 there is shown a display unit 10 of the LCD type. Said display unit 10 includes a display means 13 and a back section 14 protecting said display means 13. Said display means 13 is of a conventional type and has a display side 11 and a backside 12, and also includes the required driver circuits (not shown). A number of fluorescent tubes, which are not shown, or similar devices are provided for illuminating the display unit. Emission of the mentioned type are generated, in the driver circuits and in the fluorescent tubes or other existing illuminating means.

Figure 2:
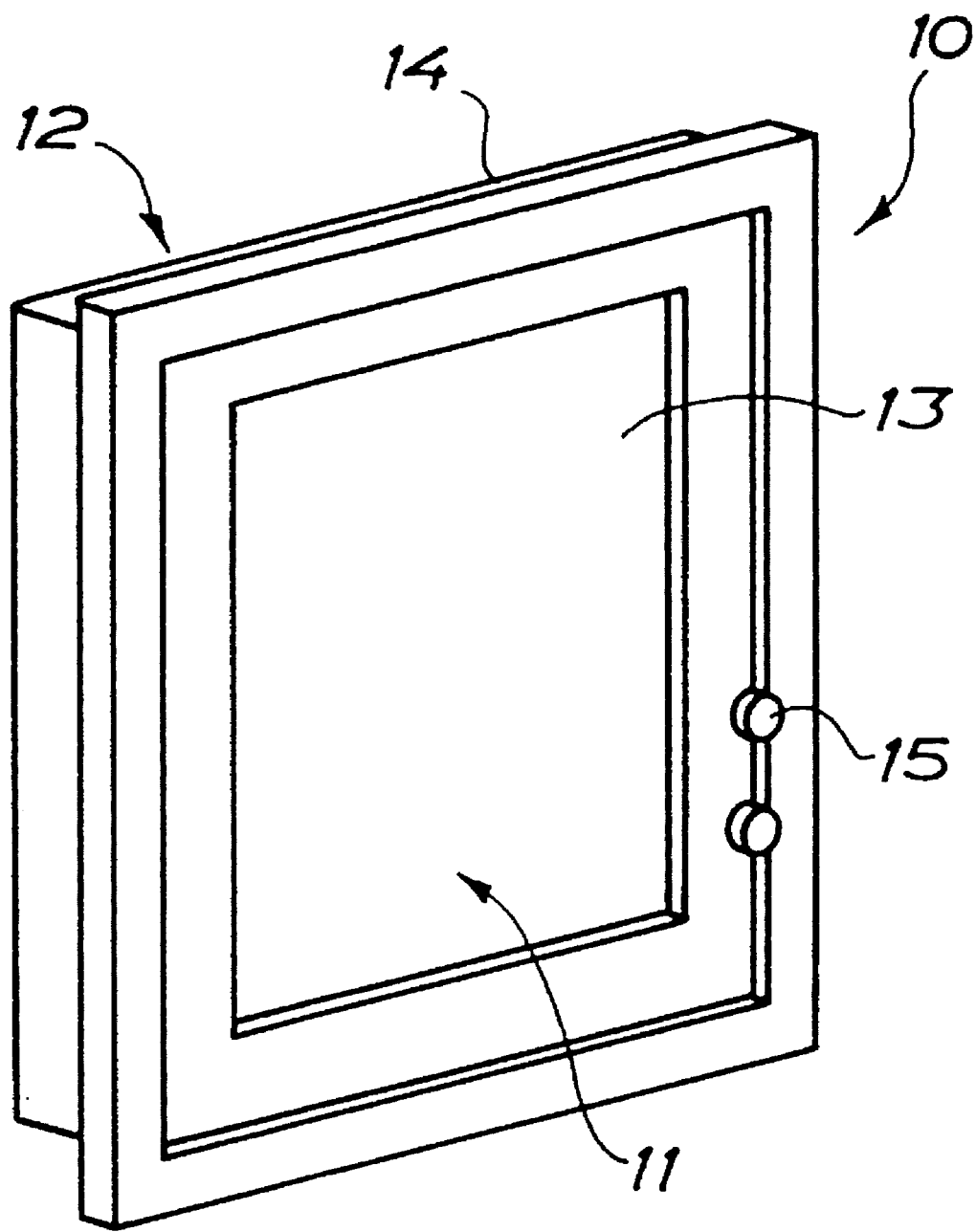
FIG. 2 is a perspective view of the display unit of FIG. 1.

FIG. 2 shows that the display unit also includes adjusting means 15 for brightness, contrast and the like. In the embodiment shown said display unit is of a conventional type and emits during operation a certain amount of time varying electrical fields. Display units of this type are used as monitors for personal computers, work stations and similar devices, and also as a part of a terminal in mini computers, cash registers and similar devices.

With reference no FIG. 1 and FIG. 2 the method according to the invention will be described in more detail. A first transparent and electrically conducting layer 11a is arranged on the display unit on the display side. In a preferred embodiment said layer consists of a network embodied in a plate, said network consisting partly of electrically conducting wires. In an alternative embodiment a network of said type is arranged directly in contact with said display means or is a part of said display means. It is also possible to apply a conducting liquid on said display side. Said liquid then dries up and will constitute said conducting layer. Irrespective of which embodiment, is provided it is essential to said conducting layer that the transparency thereof is very high and that the resistance per unit area is very low. In some embodiments the electrically conducting layer instead is arranged directly around said fluorescent tubes, said display means and/or said driver circuits of the display means, i.e., around any components of said display units generating emissions.

On the backside 12 of the display unit there is provided a second electrically conducting layer 12a having generally the same electrical properties as said layer of the display side. Said second layer is preferably applied as a liquid result. Giving generally the same result it is possible also to apply said layer directly on the backside of the display means, on the side of the rear part 14 facing the display means, or on the outside of said rear part 14. Said backside 12 can also be made of a conducting material having the electrical properties defined below.

Said both electrically conducting layers are connected electrically and also connected to ground. The connection to ground is done through the power cable or in any other way.

In practical tests and measurements there has been used on the backside of the display unit a layer, the resistance thereof per unit area being approximately 0,3 $\Omega/cm^2$, whereby on a distance of 0,15 m a value of the field strength of less than 1 V/m was measured for fields having a frequency lower than 1000 Hz. For fields having a higher frequency the value of the field strength was lower than measurable. As the background level in a normal office is approximately 6,5 V/m, the display unit will not add anything with regard to this type of the emission.

The resistance per unit area of said conducting layers can be higher than the value stated, but it is essential to the invention that the value will not be higher than any transmitted emission of the mentioned type will not be higher than the emission appearing as the background level. In some applications it is appropriate that the same type of layer is used on both sides of said display unit and for all emitting components. It is also possible to define the resistance of said conducting layers such that the total resistance as measured from any point of said display side or of said backside to a common point for the grounding should be as low as possible. Said resistance should be lower than 5 k$\Omega$. An appropriate value is 2 k$\Omega$, but materials having even better conducting properties or thicker layers of said material or said materials giving an even lower total resistance may lead to even better attenuating results. Suitable material to be included in said layers are nickel and copper. Very good properties of attenuating emission have been achieved at resistance values of approximately 100 $\Omega$ and lower. At resistance values below 10 $\Omega$ there are major difficulties to measure at all any emission of the relevant type around said display unit.

It is also possible to produce a display unit which by itself attenuates fields of the relevant type in some direction. When using this type of display unit said electrically conducting layer is applied over or around other emissions generating components, the emission thereof not being sufficiently attenuated by said display unit.

We claim:

1. Method for protecting human tissue from time varying electric fields having a field strength of approximately 100 V/m and generated in a LCD display unit having a display panel including a display side and a backside, said method comprising:

providing a first transparent and electrically conducting layer on said display side overlying said display panel, providing a second electrically conducting layer overlying said backside of said display panel, and connecting said electrically conducting layers electrically to each other and also to ground, the conductivity of said electrically conducting layers being such that the resistance from any point on said display side or said backside to the junction of said layers is lower than 5 k$\Omega$ to reduce the strength of fields passing through the layers to less than about 1 V/m at a distance from the layers of about 0.15 m.

2. Method according to claim 1, wherein the layer on said display side is a transparent network including electrically conducting wires.

3. Device for protecting human tissue from time varying electric fields having a field strength of approximately 100 V/m and generated in a LCD display unit having a display panel including a display side and a backside, said device comprising:

a first transparent and electrically conducting layer on said display side overlying said display panel, a second electrically conducting layer overlying said backside of said display panel, and said electrically conducting layers are connected electrically to each other and also connected to ground such that the resistance between any point on said display side or said backside and a junction of said electrically conducting layers is lower than 5 k$\Omega$ to reduce the strength of fields passing through the layers to less than about 1 V/m at a distance from the layers of about 0.15 m.

4. Device according to claim 3, wherein said electrically conducting layers have a conductivity which gives a resistance from any point on said display side or said backside to the junction of said layers that is lower than 2 k$\Omega$.

5. Device according to claim 4, wherein said electrically conducting layers have a conductivity which gives a resistance from any point on said display side or said backside to the junction of said layers that is lower than 100 $\Omega$.

6. Device according to claim 5, wherein said electrically conducting layers have a conductivity which gives a resistance from any point on said display side or said backside to the junction of said layers that is lower than 10 $\Omega$.

7. Method of claim 1 wherein the electrically conducting layers have a surface resistance of about 0.3 $\Omega/cm^2$.

8. Method of claim 1 wherein the time varying fields have a frequency of less than about 1000 Hz.

9. Device according to claim 3 wherein the electrically conducting layers have a surface resistance of about 0.3 $\Omega/cm^2$.

10. Device according to claim 3 wherein the time varying fields have a frequency of less than about 1000 Hz.

\* \* \* \* \*